Dec. 2, 1924.

H. REICHEL 1,517,801

APPARATUS FOR AND PROCESS OF CUTTING TIRES

Filed April 23, 1923 2 Sheets-Sheet 1

Inventor.
Hugo Reichel.
by Parker & Carter
Attorneys.

Dec. 2, 1924.

H. REICHEL 1,517,801

APPARATUS FOR AND PROCESS OF CUTTING TIRES

Filed April 23, 1923   2 Sheets-Sheet 2

Inventor
Hugo Reichel.
by Parker & Carter
Attorneys.

Patented Dec. 2, 1924.

1,517,801

UNITED STATES PATENT OFFICE.

HUGO REICHEL, OF CHICAGO, ILLINOIS.

APPARATUS FOR AND PROCESS OF CUTTING TIRES.

Application filed April 23, 1923. Serial No. 633,881.

*To all whom it may concern:*

Be it known that I, HUGO REICHEL, a citizen of the United States, residing at Chicago, in the county of Cook and State of Illinois, have invented a certain new and useful Improvement in Apparatus for and Processes of Cutting Tires, of which the following is a specification.

My invention relates to a process of and apparatus for cutting tires and has for particular purpose to provide means for cutting solid rubber tires from the automobile rim or wheel. Other objects will appear from time to time in the course of the specification and claims.

Figures 1, 4:
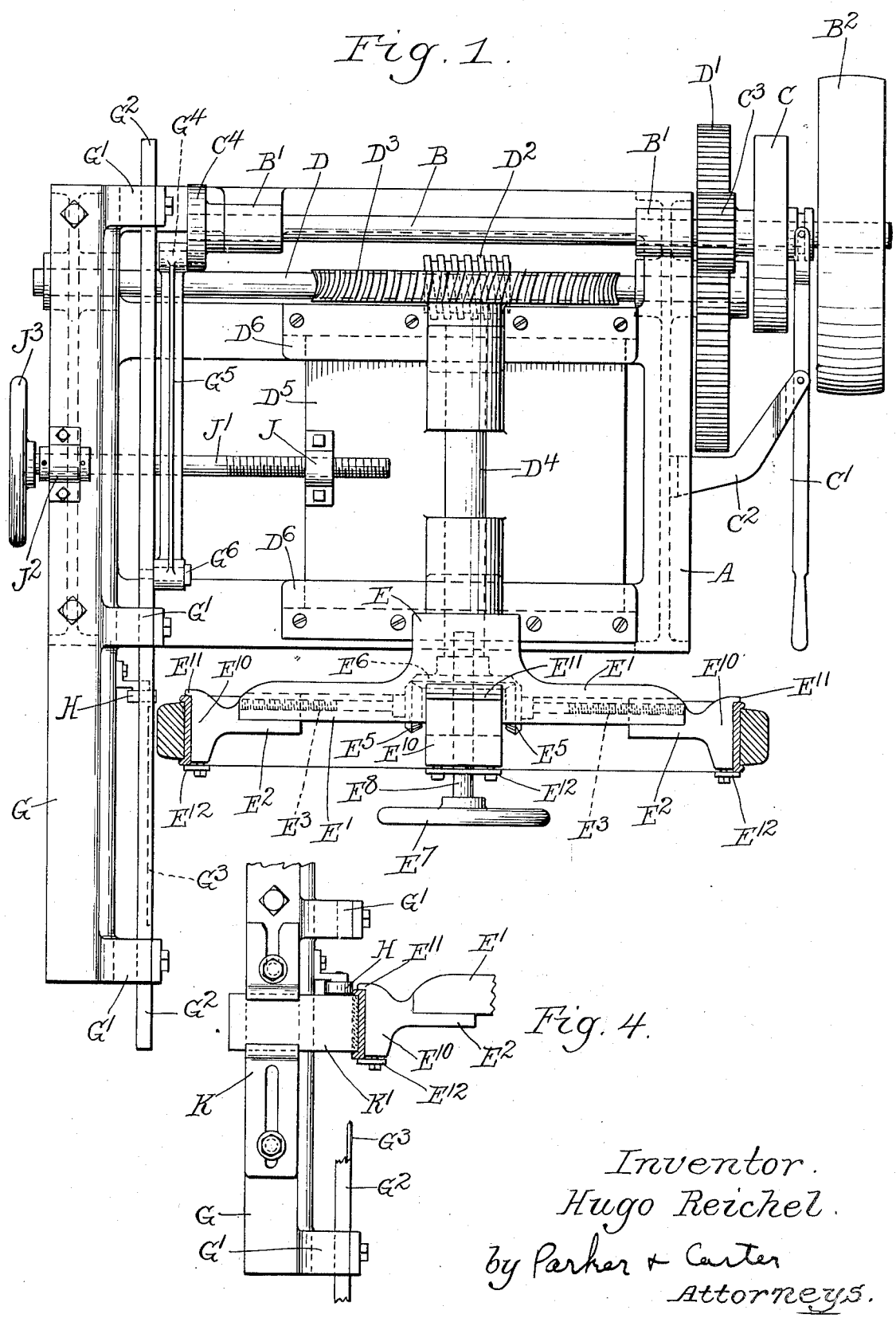
Figure 3:
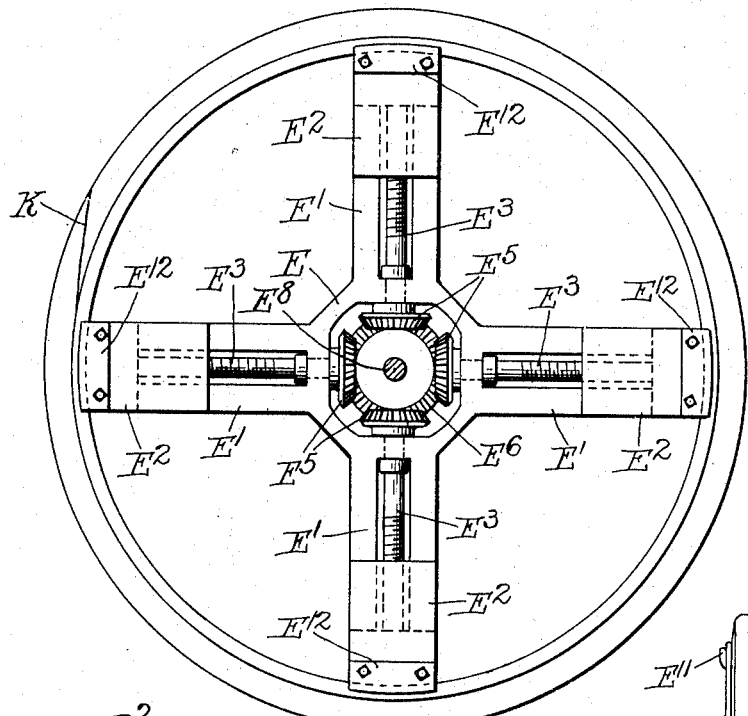
Figure 2:
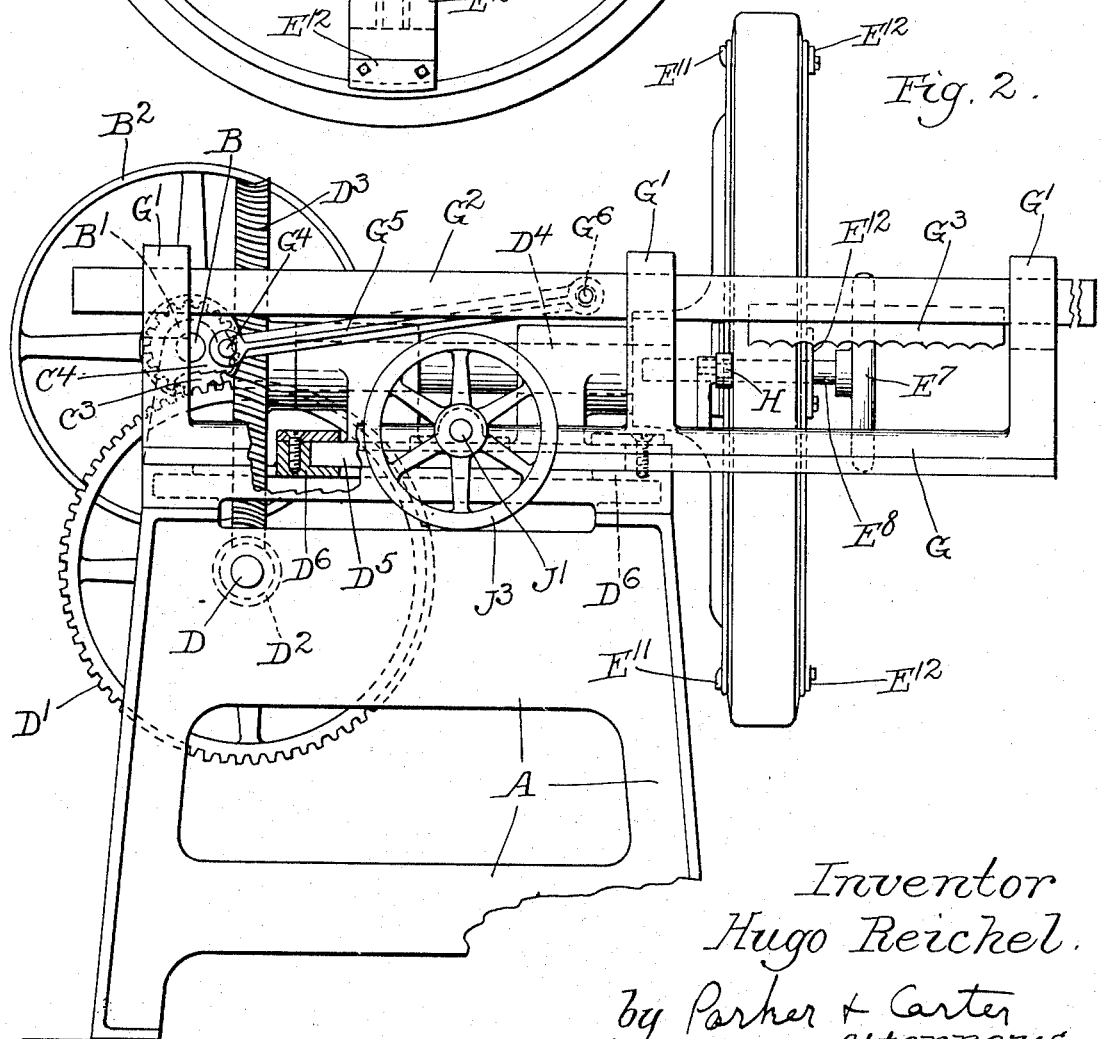

I illustrate my invention more or less diagrammatically in the accompanying drawings wherein:

Figure 1 is a plan view of my invention;
Figure 2 is a side elevation;
Figure 3 is an elevation of the rim securing means; and
Figure 4 is a detail.

Like parts are illustrated by like symbols throughout the specification and drawings.

A is any suitable base or frame structure upon which is mounted the drive shaft B which rotates in the bearings $B^1$, $B^1$. $B^2$ is a drive pulley adapted to be rotated by any suitable belt or drive mechanism actuated from a power source not herein illustrated. Intermediate between the pulley $B^2$ and the shaft B is the clutch mechanism C, the details of which form no part of the present invention, which is actuated, for example, by the lever $C^1$ pivoted at the end of the element $C^2$ outwardly projecting from the frame A. $C^3$ is a pinion upon the shaft B and $C^4$ is a crank disc, the purpose of which will later appear.

D is a worm shaft driven from the pinion $C^3$ by the gear $D^1$, and rotatably mounted in any suitable manner in the base A. It carries the worm $D^2$ in mesh with the worm wheel $D^3$ which in turn is secured upon the chuck shaft $D^4$, which in turn is supported upon and slides along the tracks $D^6$. The shaft $D^4$ carries at its opposite end any suitable chuck or arbor adapted to hold or receive an automobile rim or wheel.

The indicated mechanism consists of a central hub or support E having four, or any other suitable number of radiating slide arms $E^1$ along which slide the rim engaging elements $E^2$. The elements $E^2$ are radially movable through the four radially mounted screws $E^3$, each of which terminates in a bevel gear $E^5$, meshing with the single central bevel pinion $E^6$, which is rotated by the hand wheel $E^7$ and its shaft $E^8$, or any other suitable mechanism. Each slide $E^2$ expands at its outer end into a rim receiving portion $E^{10}$ having an inner flange abutment $E^{11}$ and an outer clamp $E^{12}$.

Mounted at the left end of the frame or support as shown in Figure 1 is the longitudinal knife support G which carries the three upwardly projecting brackets $G^1$ in which is slidably mounted the knife gear $G^2$ which carries at one end the knife $G^3$, its edges scalloped like a bread knife. On the crank disc $C^4$ is mounted the eccentric pin $G^4$ which is in rotatable engagement with the crank arm $G^5$, the opposite end of which is in rotatable engagement with the pin $G^6$ on the knife bar.

H is a guide element herein illustrated as a roller which is mounted on the support G and is so proportioned and positioned as to engage the rim of the automobile tire and wheel, when the said rim is advanced to the proper cutting position. This guide element permits a cutting adjustment wherein the knife just clears the metallic rim and severs from the wheel substantially all the rubber which projects about said rim.

Mounted on the slide $D^5$ is a block J screw threaded to receive the screw $J^1$ the opposite end of which is rotatably mounted in the block $J^2$ on the support G, being held against axial movement in relation thereto. The screw $J^1$ may be rotated by the hand wheel $J^3$ to draw the slide $D^5$ with the shaft $D^4$ and the tire support and rotate it thereby toward the knife $G^3$.

K is a knife support adapted to be slidably mounted on the support G. $K^1$ is a knife conforming substantially to the shape of the hollow in the rim, and adapted to be axially moved within the support K.

It will be realized that many changes might be made in the size, number, shape and disposition of parts without departing from the spirit of my invention, and that I do not wish to limit myself to the specific mechanical means herein shown.

The use and operation of my invention are as follows:

The rim or wheel upon which the solid tire, which it is desired to remove, is mounted, is first positioned on the adjustable chuck or arbor and clamped firmly in place. The sliding base upon which the arbor is mounted is then drawn toward the fixed knife until the knife engages the rubber. It is then progressively fed forward until the knife has cut its way to the proper depth, which is as near the edge of the rim as it can come without actually engaging it. The inclined path of the knife as the cutting commences and as the tire is fed forward towards its final cutting location is diagrammatically illustrated as K in Figure 3, although it will be understood that the path of the knife is not as regular as therein indicated.

I provide a guard, preferably in the form of a rim engaging roller, mounted beneath the knife, on the supporting frame which serves to limit the travel of the wheel or rim toward the knife, thus positively preventing engagement of the knife with the rim.

The knife itself may be of any suitable form, but I have illustrated a corrugated knife which in practice has proved to be particularly efficient for severing rubber. This knife is reciprocated through the tire and saws its way through the rubber as the tire is rotated. Preferably the tire is rotated on said roller slowly, the severing of the tire of usual size taking perhaps one minute. This feed may be accelerated, depending upon the size of the tire, the hardness of the rubber and the sharpness and hardness and heat resistance of the knife.

A peculiarly advantageous feature of my invention is the position of the knife with its edge at about the height of the axis of rotation of the rim support. The result is that as the tire is stripped off it falls forward away from the rim or may be drawn forward away from the rim, thus permitting the considerable weight of the rubber to tension the tire as it contacts the knife, and to make the cutting operation easier and to keep the frictional contact between the rubber and the sides of the knife down to a minimum. This makes the sawing or cutting operation faster, easier, saves the knife edge, prevents over-heating and permits the rubber to be sawed or cut at a rate which would otherwise be impossible.

I illustrate a single driving force with which a friction clutch may be used when the pulley is constantly driven, although I do not wish to restrict myself to this particular driving connection. The main drive shaft reciprocates the knife through a direct crank connection and rotates the tire or wheel supporting arbor through the gears and worms indicated.

The solid tires are prevailingly inset in the rim, which being hollow, cannot be entered by the knife.

Where the value of the material is sufficient to warrant it, the rubber may be scooped, planed or turned out by the use of any suitable tool mounted beneath the knife on the supporting frame, which may be adjusted to plow out the rubber, as the tire is rotated.

I have illustrated in Figure 4 a knife which may be slid along the support or frame and which may be pushed forward to contact such rubber or cement as fills the rim between its two-edge flanges.

I claim:

1. In a machine for severing a rubber tire from its rim, a rim and tire supporting element and means for securing the rim and tire thereupon, a knife and means for reciprocating it, means for guiding it along a path interesecting the plane of the tire, but beyond the periphery of the tire rim, means for rotating the tire and the rim during the reciprocation of the knife, a movable carriage for said rim and tire supporting element, and means for freely moving it toward and away from the path of the knife, and means for limiting the inward movement of the tire supporting element toward the path of the knife to the point where the tire rim closely approaches but does not contact the knife, and for holding it at that point during the severing of the tire from the rim.

2. In a machine for severing a rubber tire from its rim, a rim and tire supporting element and means for securing the rim and tire thereupon, a knife and means for guiding it along a path intersecting the plane of the tire, but beyond the periphery of the tire rim, a drive shaft, a driving connection between the drive shaft and the knife adapted to reciprocate the knife, a driving shaft for the tire supporting element, a driving connection between said shaft and the drive shaft, the two shafts lying in substantially the same horizontal plane.

3. In a tire cutting machine a supporting frame, a horizontally disposed knife bar and guides therefor, a driving element and a driving connection between said drive element and said bar adapted horizontally to reciprocate said bar, a knife mounted upon said bar, a tire supporting element and means for rotating said element about an axis parallel with the axis of reciprocation of said knife bar and lying in substantially the same horizontal plane, and means for varying the distance between said supporting element and said knife bar.

4. In a tire cutting machine a supporting frame, a horizontally disposed knife bar and guides therefor, a driving element and a driving connection between said drive element and said bar adapted horizontally to reciprocate said bar, a knife mounted upon said bar, a tire supporting element and means for rotating said element about an axis parallel with the axis of reciprocation of said knife bar and means for varying the distance between said supporting element and said knife bar, and means adapted to limit the relative movement of the knife bar and the supporting element toward each other during the severing of the tire.

5. In a tire cutting machine, a tire supporting element and means for rotating it about a substantially horizontal axis, a knife and means for reciprocating it along a substantially horizontal axis and means for moving the tire supporting element toward and from the knife, said knife being positioned at substantially the height of the axis of rotation of the tire supporting element.

6. In a tire cutting machine, a tire supporting element and means for rotating it, a knife and means for reciprocating it, a carriage for said tire supporting means, and means for moving it toward and away from the axis of reciprocation of said knife, and means for adjusting the diameter of said tire supporting element.

7. In a tire cutting machine, a tire supporting element and means for rotating it, a knife and means for reciprocating it, a carriage for said tire supporting means, and means for moving it toward and away from the axis of reciprocation of said knife, said tire supporting element comprising a central hub, a plurality of arms radiating therefrom, rim engaging elements movable along said arms and means for moving them axially in unison.

8. In a tire cutting machine, a tire supporting element and means for rotating it, a knife and means for reciprocating it, a carriage for said tire supporting means, and means for moving it toward and away from the axis of reciprocation of said knife, said tire supporting element comprising a central hub, a plurality of arms radiating therefrom, rim engaging elements movable along said arms and means for moving them axially in unison comprising a plurality of screws in mesh with said movable elements and means for rotating them in unison.

9. The process of removing a solid tire from a rim or wheel which consists in slowly rotating said wheel, advancing it laterally against a downwardly turned substantially horizontal knife, until said knife has penetrated the tire to a point closely adjacent the rim upon which it is mounted, drawing said knife backwards and forwards through said tire during its rotation, and employing the weight of the severed portion of the tire to put the unsevered portion of the tire under tension as it is carried upwardly against the edge of the knife.

10. The process of removing a solid tire from a rim or wheel which consists in slowly rotating said rib or wheel and in applying a cutting element to the tire and rotating the tire upwardly against the cutting element, and employing the weight of the severed portion of the tire to put the unsevered portion of the tire under tension as it is carried upwardly against the cutting element.

11. In a machine for severing a rubber tire from its rim, a rim and tire supporting element and means for securing a rim and tire thereupon, a knife positioned adjacent but beyond the periphery of the rim, means for varying the distance between said knife and said rim, and limiting means adapted to limit the movement of the rim and knife toward each other, to a point at which the knife is closely adjacent to but out of contact with the rim.

12. In a machine for severing a rubber tire from its rim, a rim and tire supporting element and means for securing the rim and tire thereupon, a knife positioned adjacent but beyond the periphery of the rim, means for varying the distance between said knife and said rim, and limiting means adapted to limit the movement of the rim and knife toward each other comprising a roller mounted adjacent said knife and adapted to contact said rim.

Signed at Chicago, county of Cook and State of Illinois, this 19th day of April, 1923.

HUGO REICHEL.